United States Patent
Hansen, Sr.

(10) Patent No.: US 6,318,889 B1
(45) Date of Patent: Nov. 20, 2001

(54) ICE CREAM MIXING APPARATUS FOR MIXING ICE CREAM WITH ONE OR MORE FLAVOR ADDITIVES

(75) Inventor: Asbjørn Hansen, Sr., Drammen (NO)

(73) Assignee: Marienlyst Eiendom AS, Drammen (NO)

( * ) Notice: Subject to any disclaimer, the term of this patent is extended or adjusted under 35 U.S.C. 154(b) by 0 days.

(21) Appl. No.: 09/465,787

(22) Filed: Dec. 17, 1999

(51) Int. Cl.$^7$ ....................................................... B01F 7/24
(52) U.S. Cl. ............................................................ 366/286
(58) Field of Search ...................................... 366/138, 144, 366/186, 203, 286, 289, 318, 319, 332, 333; 99/348, 460, 466; 426/518, 519; 222/413; 62/68, 320, 342, 343

(56) References Cited

U.S. PATENT DOCUMENTS

| | | | |
|---|---|---|---|
| 2,094,354 | * | 9/1937 | Genova . |
| 2,282,862 | * | 5/1942 | Genova . |
| 2,415,585 | * | 2/1947 | Genova . |
| 3,061,279 | * | 10/1962 | Reed . |
| 3,323,320 | * | 6/1967 | Conz . |
| 4,448,114 | * | 5/1984 | Mayer ................................... 366/318 |
| 4,506,988 | * | 3/1985 | Reed ..................................... 366/203 |
| 4,548,054 | | 10/1985 | Levine . |
| 4,580,905 | | 4/1986 | Schwitters et al. . |
| 4,637,221 | | 1/1987 | Levine . |
| 4,671,172 | * | 6/1987 | Stiglich ................................. 366/197 |
| 4,693,611 | * | 9/1987 | Verkler ................................. 222/413 |
| 4,708,489 | | 11/1987 | Carlson . |
| 4,740,088 | * | 4/1988 | Kelly, Jr. ............................... 366/138 |
| 4,755,060 | * | 7/1988 | Pedersen ............................... 366/286 |
| 4,974,965 | | 12/1990 | Heinhold et al. . |
| 5,067,819 | * | 11/1991 | Heinhold et al. ..................... 366/203 |

FOREIGN PATENT DOCUMENTS

| | | |
|---|---|---|
| 1011727 | 6/1977 | (CA) . |
| 2446474 | 10/1975 | (DE) . |
| 2433362 | 3/1980 | (FR) . |
| 2717988 | 10/1995 | (FR) . |
| 2736511 | 1/1997 | (FR) . |
| WO 9106221 | 5/1991 | (WO) . |

OTHER PUBLICATIONS

Japanese Patent Abstract, 10000058A, Jan. 6, 1998.

* cited by examiner

Primary Examiner—Charles E. Cooley
(74) Attorney, Agent, or Firm—Birch, Stewart, Kolasch & Birch, LLP

(57) ABSTRACT

An ice cream mixing apparatus comprises a funnel for holding ice cream and flavor additives, an auger and a linear actuator for moving the auger into the funnel, in which position a rotation of the auger will mix the ice cream and the flavor additives. A spring is arranged in series with elements transferring linear motion from the linear actuator to the auger.

10 Claims, 2 Drawing Sheets

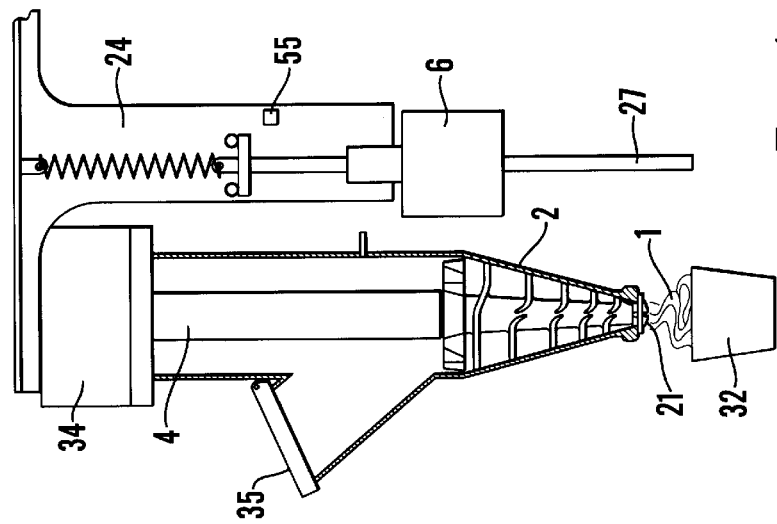
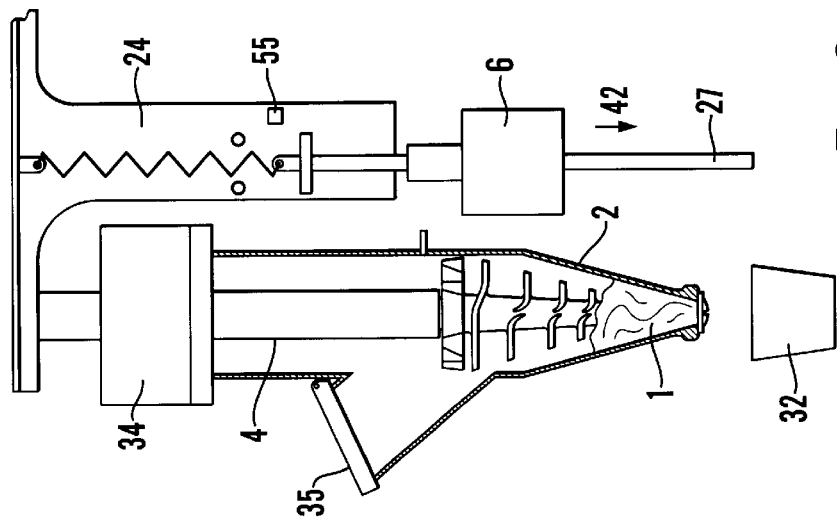
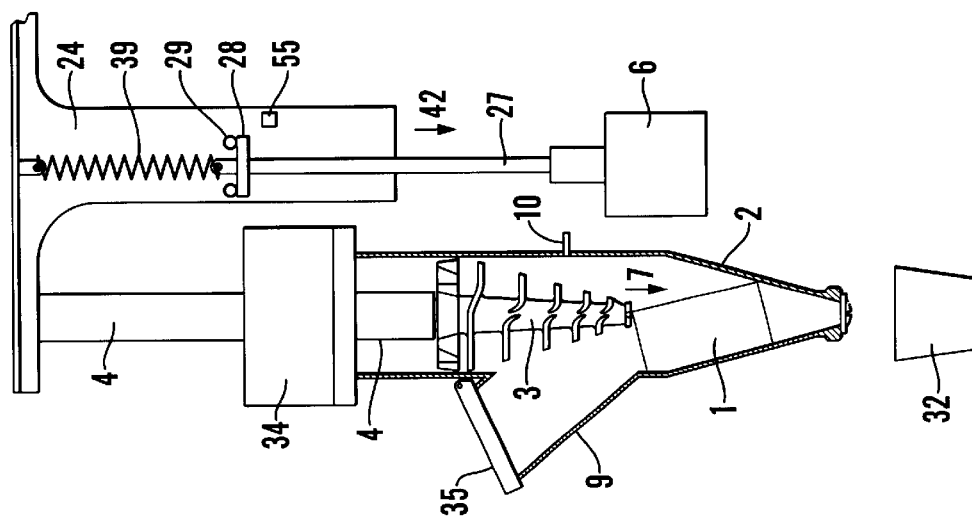

ICE CREAM MIXING APPARATUS FOR MIXING ICE CREAM WITH ONE OR MORE FLAVOR ADDITIVES

FIELD OF THE INVENTION

An ice cream mixing apparatus for mixing ice cream with one or more flavor additives comprises a funnel for holding the ice cream and the flavor additives, an auger with a spindle for creating a mixing action, an auger driver for rotating the auger spindle, and a linear actuator for relative movement of the funnel and auger into a position in which the auger is telescoped into the funnel, in which position a rotation of the auger will mix the ice cream and the flavor additives.

The ice cream will normally be in hard form, while the flavor additives may he fruits or nuts. The result of such a mixing is a semiliquid ice cream in which the flavor additives are more or less distributed, which may be sold to consumers.

BACKGROUND OF THE INVENTION

Such apparatuses are known from a number of patents. U.S. Pat. Nos. 4,548,054, 4,637,221, 4,708,489 and U.S. Pat. No. 4,974,965 all describe machines or apparatuses comprising an auger or agitator with a helical thread or cutter extending into a funnel or container for holding the ice cream and additives. The auger and funnel are relatively rotatable, and after some rotation the ice cream and additives have obtained a semiliquid condition which is attractive to consumers.

The ice cream is supplied in small, rather hard blocks. A mixing of the ice cream thus causes a rather heavy transient loading of the auger during the start of the mixing, which in turn means a rather heavy loading of the driver, which normally will be an electric motor. This is per se a problem which can be easily overcome by a correct sizing of the motor. The market price of an ice cream mixing apparatus does, however, not justify a big, costly motor, and an ice cream mixing apparatus which can utilise a small electric motor as the auger driver, would therefore be favorable.

SUMMARY OF THE INVENTION

The object of the invention is to provide an ice cream mixing apparatus for mixing ice cream with one or more flavor additives, in which the problem with a transient heavy loading of the auger driver during the start of mixing hard ice cream is reduced or eliminated.

The invention thus has an ice cream mixing apparatus for mixing ice cream with one or more flavor additives, comprising a funnel for holding the ice cream and the flavor additives, an auger with a spindle for creating a mixing action, an auger driver for rotating the auger spindle, and a linear actuator for relative movement of the funnel and auger into a position in which the auger is telescoped into the funnel, in which position a rotation of the auger will mix the ice cream and the flavor additives. The linear actuator is movable between an upper position corresponding to the auger being withdrawn from the funnel and a lower position corresponding to the auger being within the funnel. A spring means is arranged in series with elements transferring linear motion from the actuator to the auger.

A moving of the linear actuator towards the lower position causes the auger to enter the funnel. Resistance from hard ice cream in the funnel does, however, prevent the auger from penetrating the ice cream. This causes the spring means to extend and allow further moving of the linear actuator towards the lower position. The extension of the spring means causes a tension force which is transferred to the auger, and acts as an axial force between the auger and the ice cream. This axial force pushes the auger into the ice cream in the funnel.

After some rotation, the auger rotation causes the ice cream to soften, which allows the auger to penetrate the ice cream. The spring means then retracts and forces the auger into the ice cream. The auger thus enters the ice cream gradually as the ice cream softens.

The axial force on the auger is almost proportional to the rotation load which acts on the auger due to high viscosity in the ice cream. The control of the axial force as described above is thus a control of the load acting on the driver, and the problem with a transient heavy loading of the auger driver during the start of mixing hard ice cream is thus reduced or eliminated.

Preferably the auger spindle is axially supported by a driver bracket which is movable towards the funnel, and the linear actuator is arranged to act parallel to the auger spindle for generating the movement of the driver bracket, i.e. the movement which causes the auger to enter the funnel. In this embodiment the spring means is arranged between the driver bracket and the linear actuator.

Preferably the spring means is movable between a retracted position in which stopper elements prevent a further retraction of the spring means, and an extended position in which the spring means exerts a maximum tension force.

The maximum tension force exerted by the spring means in the extended position is preferably adapted to the maximum allowable force not to overload the auger driver. In this way it is ensured that an overloading of the auger driver does not take place.

Preferably the stopper elements are adapted to be in engagement when the linear actuator is in the lower position and the auger is fully within the funnel thereby causing a movement of the linear actuator towards the upper position to withdraw the auger from the funnel.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

It is preferred that the auger operate at a high speed when unloaded or slightly loaded, and low speed when heavy loaded. To control the changeover between low speed and high speed, the ice cream mixing apparatus preferably comprises a sensor which detects a predetermined extension of the spring means, corresponding to a predetermined axial load of the auger, which, as discussed above, corresponds to a certain rotational load of the auger. This sensor controls a switch which changes the motor speed.

BRIEF DESCRIPTION OF THE DRAWINGS

The invention will now be explained by a description of a preferred embodiment with reference to the accompanying drawings which are given by way of illustration only, and thus are not limitative of the present invention.

FIG. 2 is a view corresponding to FIG. 1, illustrating the parts of the ice cream mixing apparatus which are essential to the invention, the auger being about to enter the funnel.

FIG. 3 is a side view corresponding to FIG. 2, the auger being partly within the funnel.

FIG. 4 is a side view corresponding to FIG. 2 and 3, the auger being fully within the funnel.

DESCRIPTION OF THE PREFERRED EMBODIMENTS

Figure 1:
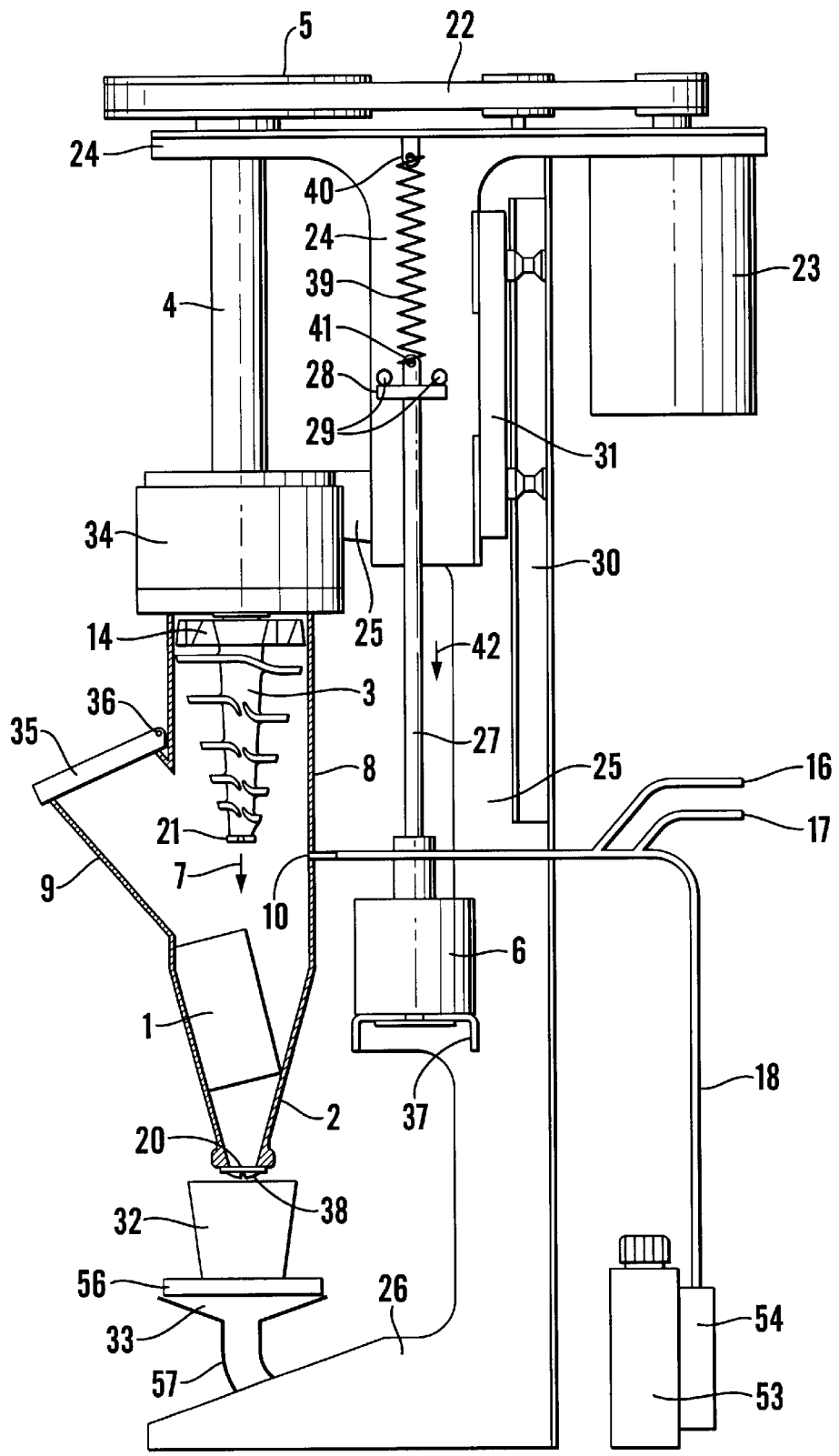
FIG. 1 is a schematic side view of an ice cream mixing apparatus according to the invention, the auger being outside the funnel.

FIG. 1 is a schematic side view of an ice cream mixing apparatus for mixing ice cream with one or more flavor additives according to the invention, illustrating the principal parts. The ice cream mixing apparatus comprises a frame 25 with a foot 26 for placing on a not illustrated support, e.g. a table. A funnel 2 for holding the ice cream and flavor additives is supported by an auger bearing box 34, which is supported by the frame 25. An essentially vertical auger 3 with its spindle 4 is rotatably supported by journal bearings in the auger bearing box 34, and axially supported by a driver bracket 24. The driver bracket 24 also supports an auger driver 5, which has an auger motor 23 and a sheave/belt transmission 22 for transferring rotational movement to the auger spindle 4.

The funnel 2 forms part of an enclosure 8 with a closable inlet 9 which is slanting upwards, and which can be closed by a lid 35 which is hinged to the inlet 9 in a hinge 36. A funnel outlet 20 with an ice cream nozzle 38 points at a cup 32 which is placed in a cup holder 56. The cup holder is perforated to allow wash water and spilt ice cream to flow to a sink 33 and further to a drain conduit 57.

A linear actuator 6, which may be a pneumatic cylinder, or preferably an electrically operated linear actuator, is attached to the apparatus frame 25 via an actuator bracket 37. An actuator rod 27 extends vertically from the linear actuator 6 and is movable by the linear actuator 6. The actuator rod 27 is connected to a spring means 39 in a lower spring attachment 41. The spring means 39 is attached to the driver bracket 24 in an upper spring attachment 40, and thus the spring means 39 is arranged between the linear actuator 6 and the driver bracket 24. The driver bracket 24 is attached to a slide bracket 31 which via a rail 30 which is fixed to the frame 25 is slidingly guided in a vertical direction, illustrated by an arrow 42, and the driver bracket 24 is thus movable towards the funnel 2 The linear actuator 6 is arranged to act parallel to the auger spindle 4 for generating the movement of the driver bracket 24. In this way the spring means 39 is arranged in series with elements transferring linear motion from the linear actuator 6 to the auger 3.

In FIG. 1 the spring means 39 is illustrated in its retracted position. Corresponding stopper elements formed by a stopper bar 28 on the actuator rod 27 and stopper bolts 29 on the driver bracket 24 are in engagement and prevent a retraction of the spring means 39 beyond its retracted position. In this position the spring means 39 is somewhat pretensioned and exerts a minimum tension force, in order to prevent play during initial extension of the spring means.

In FIG. 1 the linear actuator 6, i.e. the actuator rod 27, is illustrated in an upper position, and the auger 3 is illustrated in a corresponding position outside the funnel 2. An activating of the linear actuator 6 causes the actuator rod 27 to move down, in the direction illustrated by arrow 42. The movement of the actuator rod 27 is via the spring means 39 transferred to the driver bracket 24, causing the driver bracket with the sheave/belt transmission 22, the motor 23 and the auger spindle 4 to move down, in the direction of the arrow 42. The auger 3 thus moves down as illustrated by arrow 7.

In FIG. 2 the auger 3 has moved down and entered the funnel 2, and hit a block of ice cream 1 which is located in the funnel 2.

In FIG. 3 the actuator rod 27 has moved further down in the direction 42, and reached a lower position. Resistance from the hard ice cream 1 has prevented the auger 3 from completely penetrating the ice cream 1. The spring means 39 is thus extended, and exerts a force which tries to force the auger 3 into the ice cream 1.

The auger 3 is simultaneously rotated, which softens the ice cream 1. The spring means 39 retracts and forces the auger 3 into the ice cream 1, and after some time the auger 3 is telescoped into the funnel 2.

In FIG. 4 the auger 3 is fully within the funnel 2, and the ice cream 1 is about to be poured into the cup 32.

When the end 21 of the auger 3 reaches the bottom of the funnel 2, the spring means 39 will again be in the retracted position, and the stopper bar 28 and the stopper bolts 29 will again be in engagement, as in FIG. 4. A reversing of the linear actuator 6, i.e. a movement of the actuator rod 27 in the direction opposite the arrow 42, will withdraw the auger 3 from the funnel 2.

In the illustrated embodiment, the spring means 39 is an extension spring. It should be understood that other springs are conceivable, e g. a compression spring which is compressed by the actuator rod 27 being arranged within the compression spring and attached to the end of the spring which is distal to the linear actuator 6, while the driver bracket 24 is attached to the end of the spring which is proximal to the linear actuator. The spring means may also be a gas spring, comprising a gas filled cylinder and a piston which can compress the gas.

If no softening of the ice cream takes place during the movement of the linear actuator 6 to its lower position, the spring means 39 will reach an extended position in which the spring means 39 exerts a maximum tension force. This maximum tension force is the maximum force that can occur to push the auger 3 into the ice cream I. The resistance from the ice cream to penetration by the auger 3 essentially corresponds to the resistance to rotation, and thus, in order not to overload the auger driver 5, i.e. the electric motor 23, the maximum tension force exerted by the spring means 39 in the extended position should be adapted to the maximum allowable force which is acceptable in order not to overload the auger driver.

FIGS. 2–4 also illustrate a sensor 55 for detecting a predetermined extension of the spring means 39. The sensor 55 produces a signal to the control unit, which is used to switch the auger driver 5, i.e. the electric motor 23, between a high speed and a low speed. In this way the electric motor 23 can be operated at a high speed when the spring means 39 is retracted below the predetermined extension, and at a low speed when the spring means 39 is extended beyond the predetermined extension. As mentioned above, the resistance from the ice cream to penetration by the auger 3, which corresponds to the extension of the spring means 39, essentially corresponds to the resistance to rotation produced by the ice cream. The sensor 55 thus provides a simple way of determining when the resistance to the rotation reaches a certain value, and switching the speed of the motor according to this.

The sensor 55 may be a microswitch or a capacitive or inductive proximity switch.

FIG. 1 also illustrates a spray nozzle 10 for pointing a water spray at the auger 3 for washing purposes. A vane wheel 14 is located in a transition area between the auger 3 and the auger spindle 4, causing a deflection of the water spray during a movement of the auger 3 past the spray nozzle 10. A heated water supply 16, a cold water supply 17 and a liquid detergent supply 18, in which liquid detergent is supplied from a liquid detergent container 53 via a pump 54, and corresponding not illustrated control valves, allow various spraying concepts to be used for washing or rinsing the enclosure 8 and the auger 3 between the ice cream mixing.

The ice cream mixing apparatus also includes electric circuitry with a programmable electronic control unit, a power supply, switches, pushbuttons and lamps. In order not to overload FIG. 1, these items are left out. The electronic control unit may include microelectronics for both manual and automatic activation of the linear actuator, switches, lamps, motors and control valves. The automatic activation can be based on input from sensors or a timer and include sequencing of functions. These items as well as their functioning and physical arrangement are conventional, and do not form a part of the invention.

In use the operator puts a charge of ice cream 1, typically hard ice cream, and a charge of flavor additive, typically fruit, berries or nuts (not illustrated), into the inlet 9. He then pushes a button which activates the auger motor 23 and the linear actuator 6, and the auger 3 enters the funnel 2, as explained above. The rotation of the auger 3 causes a mixing of the ice cream 1 and the flavor additives into a semiliquid mixture which after a certain time, e.g. 5 seconds, is poured out through the outlet 20 and into the cup 32 for consumption. The nozzle 38, which may have the shape of e.g. a star, gives the ice cream mixture the desired shape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention has in the above been described with reference to an ice cream mixing apparatus in which the funnel is stationary, and the auger is essentially vertical and telescoped into the funnel from above by a linear actuator. It should however be understood that the invention will be equally applicable for an ice cream mixing apparatus with an auger with a different orientation, e g. horizontal, and a different principle for creating the relative movement for telescoping the auger into the funnel, e.g. by moving the funnel.

What is claimed is:

1. An ice cream mixing apparatus for mixing ice cream with one or more flavor additives, comprising:

a funnel for holding the ice cream and the flavor additives;

an auger with a spindle for creating a mixing action;

an auger driver for rotating the auger spindle;

a linear actuator for relative movement of the funnel and auger into a position in which the auger is telescoped into the funnel, in which position a rotation of the auger will mix the ice cream and the flavor additives, the linear actuator being movable between an upper position corresponding to the auger being outside the funnel and a lower position corresponding to the auger being within the funnel; and spring means arranged in series with elements transferring linear motion from the linear actuator to the auger.

2. The apparatus according to claim 1, wherein upon moving the linear actuator towards the lower position, causing the auger to enter the funnel, and resistance from the ice cream prevents the auger from penetrating the ice cream, the spring means extends and allows further moving of the linear actuator towards the lower position.

3. The apparatus according to claim 2, wherein upon some rotation of the auger, causing the ice cream to soften and allow the auger to penetrate the ice cream, the spring means retracts and forces the auger into the ice cream.

4. The apparatus according to claim 1, wherein the spring means is movable between a retracted position in which stopper elements prevent a further retraction of the spring means, and an extended position in which the spring means exerts a maximum tension force, which tension force pushes the auger into the ice cream in the funnel.

5. The apparatus according to claim 4, wherein a maximum tension force exerted by the spring means in the extended position is adapted to a maximum allowable force not to overload the auger driver.

6. The apparatus according to claim 4, wherein the stopper elements are adapted to be in engagement when the linear actuator is in the lower position and the auger is fully within the funnel, a movement of the linear actuator towards the upper position thereby causing a withdrawal of the auger from the funnel.

7. The apparatus according to claim 4, wherein the spring means in the retracted position is pretensioned and exerts a minimum tension force, in order to prevent play during initial extension of the spring means.

8. The apparatus according to claim 1, wherein the auger spindle is axially supported by a driver bracket which is movable towards the funnel, the linear actuator is arranged to act parallel to the auger spindle for generating the movement of the driver bracket, and that the spring means is arranged between the driver bracket and the linear actuator.

9. The apparatus according to claim 8, further comprising:

an actuator rod which is movable by the linear actuator and connected to the spring means; and stopper elements formed by a stopper bar on the actuator rod and one or more stopper bolts on the driver bracket.

10. The apparatus according to claim 1, further comprising a sensor detecting a predetermined extension of the spring means, for operating the auger driver at a high speed when the spring means is retracted below the predetermined extension, and operating the auger driver at a low speed when the spring means is extended beyond the predetermined extension.

* * * * *